US012658159B1

(12) United States Patent
Tye et al.

(10) Patent No.: US 12,658,159 B1
(45) Date of Patent: Jun. 16, 2026

(54) SYSTEM AND METHOD OF RAPID MANUAL SWITCHING OF DISPLAY RESOLUTION AND DISPLAY REFRESH RATE ONBOARD A DIGITAL DISPLAY DEVICE

(71) Applicant: Dell Products LP, Round Rock, TX (US)

(72) Inventors: Bee June Tye, Singapore (SG); Lei Guo, Singapore (SG); Yu Wei-Kuo, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/187,561

(22) Filed: Apr. 23, 2025

(51) Int. Cl.
*G09G 5/00* (2006.01)
*G06F 3/0338* (2013.01)

(52) U.S. Cl.
CPC ........... *G09G 5/005* (2013.01); *G06F 3/0338* (2013.01); *G09G 2340/0435* (2013.01); *G09G 2354/00* (2013.01)

(58) Field of Classification Search
CPC .......... G06F 3/011; G06F 3/013; G06F 3/017; G06F 3/167; G06T 19/006; G06V 20/20; G06V 40/20; G06V 40/28; G10L 15/22; G10L 2015/223
See application file for complete search history.

(56) References Cited

U.S. PATENT DOCUMENTS

| | | | |
|---|---|---|---|
| 5,977,933 | A | 11/1999 | Wicher |
| 7,893,943 | B1 | 2/2011 | West |
| 8,723,891 | B2 | 5/2014 | Chowdhry |
| 2007/0038939 | A1 | 2/2007 | Challen |
| 2009/0225108 | A1 | 9/2009 | Shen |
| 2018/0343497 | A1 | 11/2018 | Brown |
| 2020/0111443 | A1 | 4/2020 | Sasaki |
| 2020/0241826 | A1* | 7/2020 | Srinivasan ............ G06F 3/1446 |
| 2023/0351702 | A1* | 11/2023 | Tan ......................... G10L 15/22 |

FOREIGN PATENT DOCUMENTS

WO      2011/135052 A1      11/2011

* cited by examiner

*Primary Examiner* — Insa Sadio

(74) *Attorney, Agent, or Firm* — Prol Intellectual Property Law, PLLC; H. Kenneth Prol

(57)                ABSTRACT

A digital display device comprises a digital signal processing hardware controller to execute machine readable code instructions to display a video signal generated by a graphics processing unit (GPU) of an operably connected information handling system at a first display resolution. The digital signal processing hardware controller executes machine readable code instructions of a rapid manual monitor display mode adjustment system to receive a user instruction, via a user manipulating a manual joystick directional device onboard the digital display device to select a dual resolution mode toggle selection button within an on screen display (OSD) control guide for rapidly switching between two defined display resolutions or to select a user selected resolution mode from an OSD menu to identify an updated resolution onboard the digital display device and to automatically transmit a single byte notification to instruct the GPU to generate the video signal with the updated display resolution.

20 Claims, 6 Drawing Sheets

360

460

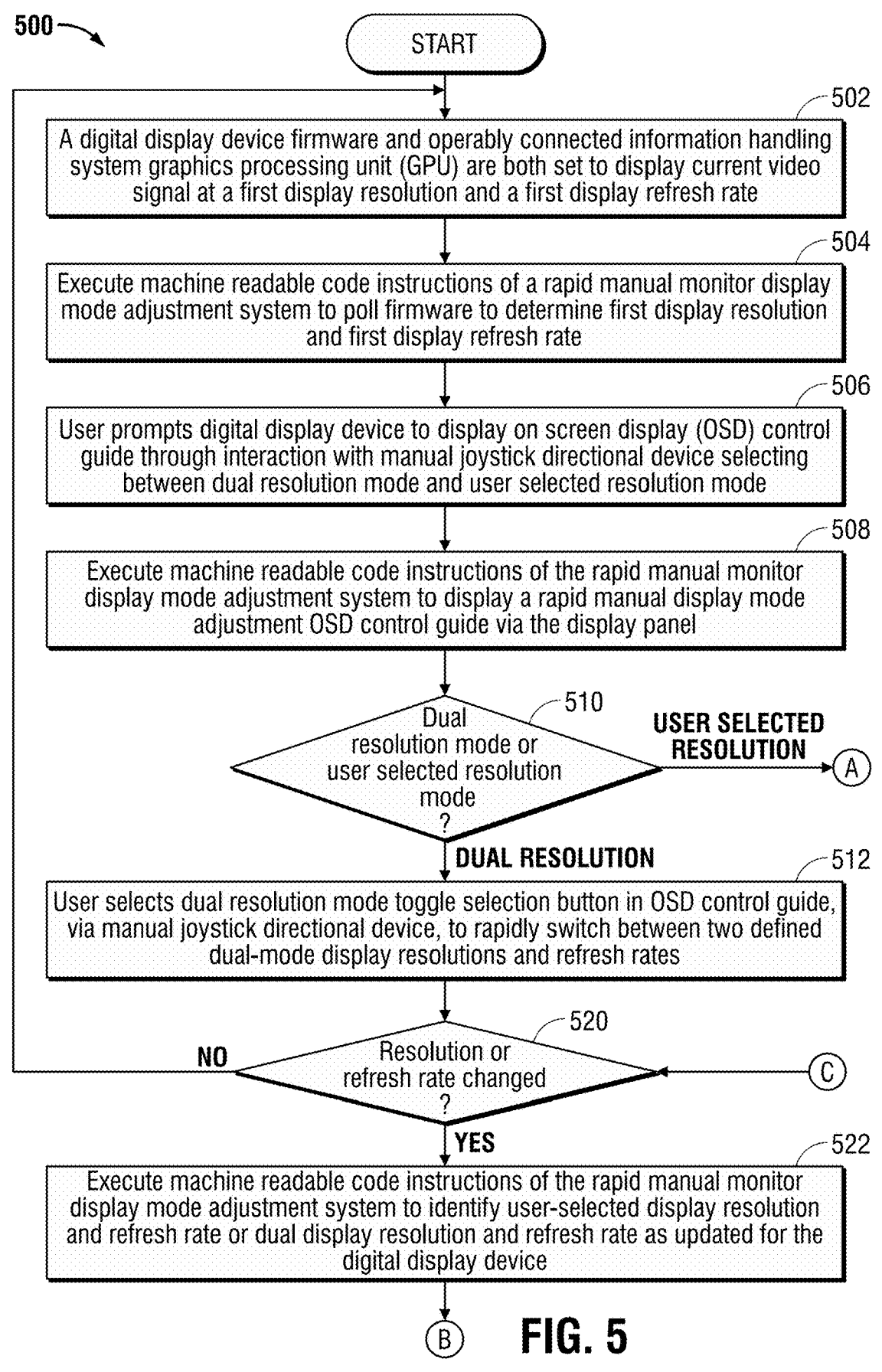

500

START

502

A digital display device firmware and operably connected information handling system graphics processing unit (GPU) are both set to display current video signal at a first display resolution and a first display refresh rate

504

Execute machine readable code instructions of a rapid manual monitor display mode adjustment system to poll firmware to determine first display resolution and first display refresh rate

506

User prompts digital display device to display on screen display (OSD) control guide through interaction with manual joystick directional device selecting between dual resolution mode and user selected resolution mode

508

Execute machine readable code instructions of the rapid manual monitor display mode adjustment system to display a rapid manual display mode adjustment OSD control guide via the display panel

510

Dual resolution mode or user selected resolution mode ?

USER SELECTED RESOLUTION   (A)

DUAL RESOLUTION

512

User selects dual resolution mode toggle selection button in OSD control guide, via manual joystick directional device, to rapidly switch between two defined dual-mode display resolutions and refresh rates

520

NO     Resolution or refresh rate changed ?     (C)

YES

522

Execute machine readable code instructions of the rapid manual monitor display mode adjustment system to identify user-selected display resolution and refresh rate or dual display resolution and refresh rate as updated for the digital display device (B)   FIG. 5

Ⓐ                                    Ⓑ

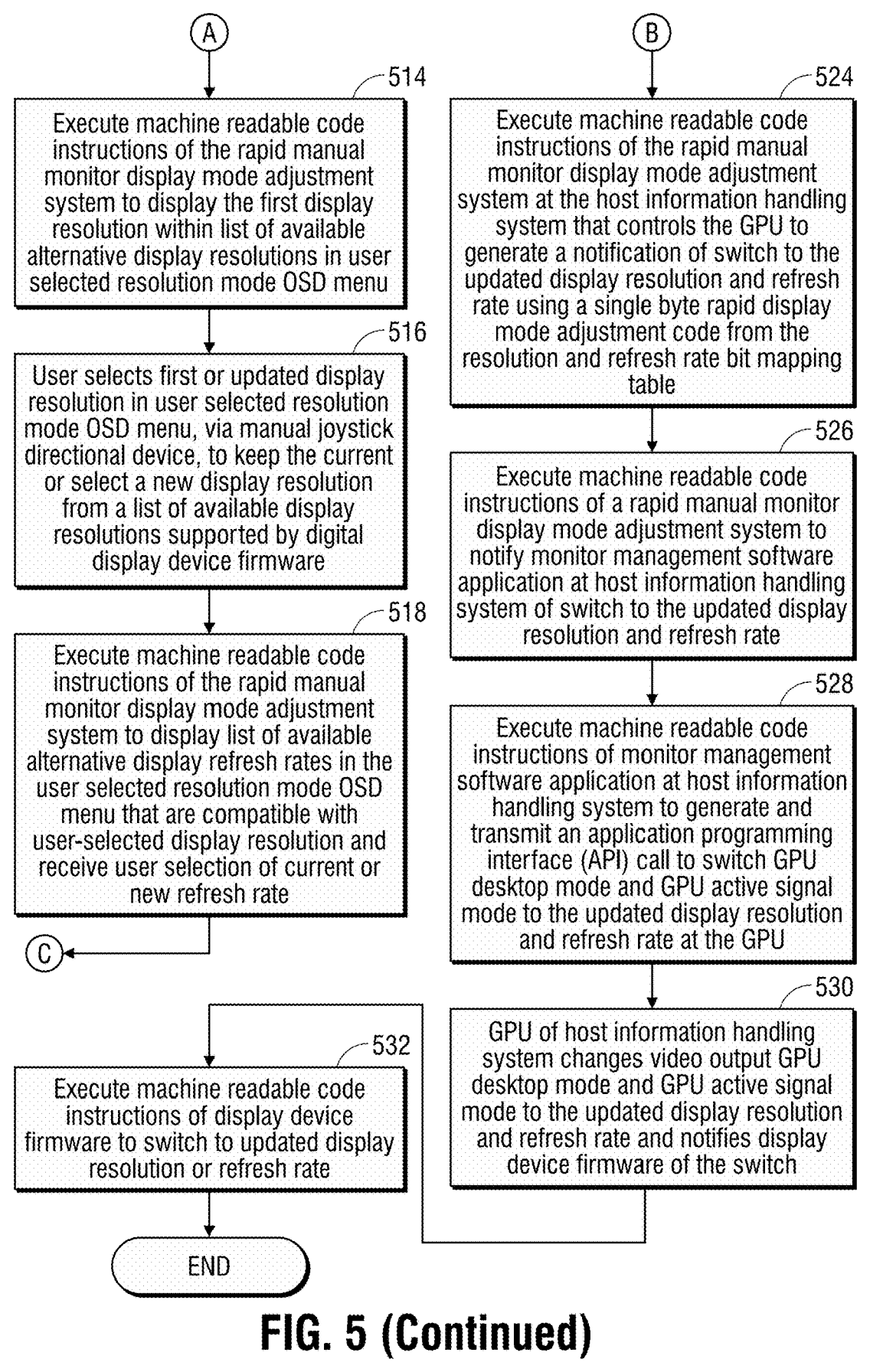

~514
Execute machine readable code instructions of the rapid manual monitor display mode adjustment system to display the first display resolution within list of available alternative display resolutions in user selected resolution mode OSD menu ~524
Execute machine readable code instructions of the rapid manual monitor display mode adjustment system at the host information handling system that controls the GPU to generate a notification of switch to the updated display resolution and refresh rate using a single byte rapid display mode adjustment code from the resolution and refresh rate bit mapping table ~516
User selects first or updated display resolution in user selected resolution mode OSD menu, via manual joystick directional device, to keep the current or select a new display resolution from a list of available display resolutions supported by digital display device firmware ~526
Execute machine readable code instructions of a rapid manual monitor display mode adjustment system to notify monitor management software application at host information handling system of switch to the updated display resolution and refresh rate ~518
Execute machine readable code instructions of the rapid manual monitor display mode adjustment system to display list of available alternative display refresh rates in the user selected resolution mode OSD menu that are compatible with user-selected display resolution and receive user selection of current or new refresh rate ~528
Execute machine readable code instructions of monitor management software application at host information handling system to generate and transmit an application programming interface (API) call to switch GPU desktop mode and GPU active signal mode to the updated display resolution and refresh rate at the GPU

Ⓒ

~530
GPU of host information handling system changes video output GPU desktop mode and GPU active signal mode to the updated display resolution and refresh rate and notifies display device firmware of the switch ~532
Execute machine readable code instructions of display device firmware to switch to updated display resolution or refresh rate

END

FIG. 5 (Continued)

SYSTEM AND METHOD OF RAPID MANUAL SWITCHING OF DISPLAY RESOLUTION AND DISPLAY REFRESH RATE ONBOARD A DIGITAL DISPLAY DEVICE

FIELD OF THE DISCLOSURE

The present disclosure generally relates to digital display devices that operatively couple with an information handling system to perform as monitors or external displays for the information handling system. The present disclosure more specifically relates to a standalone digital display device receiving user input, via navigation through one or more on screen display (OSD) control guides or resolution and refresh rate menus using a manual joystick directional device within the housing of the digital display device, to rapidly adjust the display resolution or the display refresh rate with limited steps and in reduced time for adjustment to a video signal generated by a graphics processing unit (GPU) of an operatively coupled information handling system and to the display panel of the digital display device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may include a graphics processing unit to process video data signals from executing software or firmware applications for display at an operatively-coupled digital display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a flow diagram illustrating a method of executing machine readable code instructions of a rapid manual monitor display mode adjustment system with a display hardware controller for streamlining a process by which a user adjusts display resolution and refresh rates onboard a digital display device according to an embodiment of the present disclosure.

The use of the same reference symbols in different drawings may indicate similar or identical items.

DETAILED DESCRIPTION OF THE DRAWINGS

Figure 1:
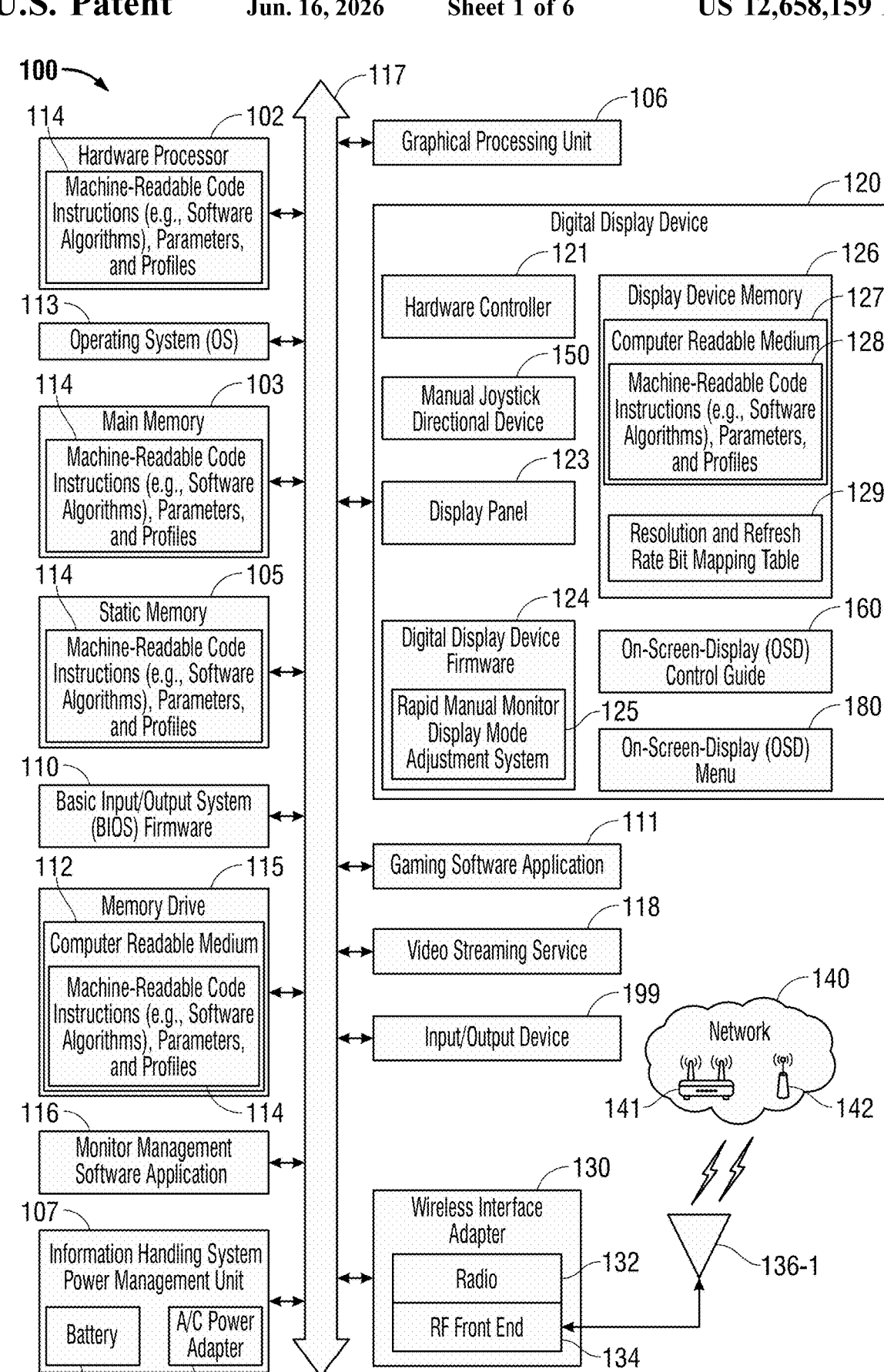
FIG. 1 is a block diagram illustrating an information handling system operatively coupled to a digital display device with a display hardware controller executing machine readable code instructions of a rapid manual monitor display mode adjustment system onboard the digital display device to rapidly switch between display resolutions and display refresh rates according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Digital display devices may operatively couple to information handling systems to act as monitors or external displays for the information handling systems. When operatively coupled, the digital display device may receive a video signal from such an operatively coupled information handling system either wirelessly, via a wireless interface adapter, or through a wired communication port such as a universal serial bus type-C (USB-C) port, Thunderbolt® port, high definition multimedia interface (HDMI) port, DisplayPort® (DP), or mini-DP®, for example. The formatting of the video signal generated by the graphics processing unit (GPU) of the operatively coupled information handling system in existing systems may be controlled by a software application, such as a monitor management software application executing within the operating system (OS), of the information handling system at the information handling system. In order to ensure that the GPU formats the video signal to be capable of display via the digital display device, the monitor management software application in existing systems may request and receive from the digital display device an external device identifier (EDID) that identifies one or more display resolutions and one or more display refresh rates at which the digital display device display panel may be capable of operating. Upon such a communication, the monitor management software application operating at the OS on the information handling system may generate or adjust a plurality of existing user selection menus, such as cascading pull-down menus that allow the user to select from these available pluralities of display resolutions and display refresh rates at the operatively coupled information handling system.

Such a selection, however, may require navigating through several steps or several pull-down menus to reach the portion of the user selection menus that adjust display resolution or display refresh rates via the monitor management software application operating at the OS on the information handling system. The user in many cases may need to switch the display resolution or display refresh rate to be compatible with or maximize experience in operating a specific software gaming application, gaming platform, or video streaming service, for example. In addition to a higher burden of steps navigating the OS menus at the monitor management software application operating at the information handling system, an extended time may be required for the monitor management software application to communicate with the digital display device, receive the EDID, and then adjust the display resolutions and display refresh rates made available for selection via the OS menus to match those supported by the digital display device. Then, the user must navigate through the plurality of menus (e.g., up to seven steps), and then the information handling system must coordinate the change of the display resolution and display refresh rate between the GPU of the information handling system and the digital display device (up to six seconds). This delay may negatively impact user experience with the gaming software application, gaming platform, or video streaming service. A solution is needed that minimizes the number of steps necessary for the user to adjust the display resolution and display refresh rate, and the time required to coordinate such an adjustment at both the GPU of the information handling system and the digital display device.

In embodiments of the present disclosure, a digital signal processor (DSP) or other display hardware controller of the digital display device executing machine readable code instructions of a rapid manual monitor display mode adjustment system may address these issues by streamlining the process by which the user adjusts the display resolution and display refresh rates onboard the digital display device itself and with the coordination of such an adjustment between the GPU and the digital display device. The DSP hardware controller of the digital display device executing code instructions of the rapid manual monitor display mode adjustment system in an embodiment may shift control of adjustments to display resolution and display refresh rates to the digital display device from the information handling systems and OS thereon. This allows the user to quickly select new display resolution or new display refresh rate from a direct-access rapid manual display mode adjustment on screen display (OSD) control guide and OSD resolution and refresh rate menu, if needed, that is streamlined. The DSP hardware controller of the digital display device executing code instructions of the rapid manual monitor display mode adjustment system prompt the user to select via the direct-access rapid manual display mode adjustment OSD control guide adjustments with a dual resolution mode or a user selection mode. When the user selects dual resolution mode, the user may use a toggle function on a manual joystick directional device to toggle between two combinations of popularly used display resolutions and display refresh rates. When a user selects the user selection mode, the user is prompted with a direct-access rapid manual display mode adjustment OSD resolution and refresh rate menu that includes a condensed list of available display resolutions and available display refresh rates for selection with the manual joystick directional device on the digital display device.

In various embodiments herein, the DSP hardware controller of the digital display device executing code instructions of the rapid manual monitor display mode adjustment system supports both a dual resolution mode that allows users to choose between two combinations of display resolutions (e.g., 4K or full high definition (FHD)) and display refresh rates (e.g., 165 HZ or 330 Hz) commonly supported by popular gaming software applications, gaming platforms, or video streaming services, and a user selected resolution mode that allows the user to choose from a condensed list of available display resolutions and a limited list of display refresh rates expanded beyond the dual resolution modes that are compatible with the user-selected display resolution. In such embodiments, the DSP hardware controller of the digital display device executing machine readable code instructions of the rapid manual monitor display mode adjustment system decreases the number of steps required and time consumed in adjusting the display resolution and display refresh rate. Further, execution of the rapid manual monitor display mode adjustment system at the digital display device improves the method of coordinating such an adjustment to resolution and refresh rate between the GPU at the information handling system and the digital display device firmware at the standalone digital display device.

In embodiments herein, the DSP hardware controller of the digital display device executes code instructions of the display device firmware to display video at a first display resolution (e.g., 4K or 3840 pixels by 2160 pixels) and a first display refresh rate that match the resolution and refresh rate (e.g., 165 Hz), respectively, of a video signal received from an operably connected information handling system, as set by a graphics processing unit (GPU) of the information handling system. The DSP hardware controller of the digital display device in an embodiment may execute machine readable code instructions of a rapid manual monitor display mode adjustment system to poll the digital display device firmware to determine a current display resolution and a current display refresh rate. The user in an embodiment may prompt the rapid manual display mode adjustment on screen display (OSD) menu through interaction with a manual joystick directional device housed within the digital display device housing.

The DSP hardware controller of the digital display device in embodiments may execute machine readable code instructions of the rapid manual monitor display mode adjustment system to display the rapid manual display mode adjustment OSD control guide via the display panel, to allow a user to select between a dual resolution mode and a user selected resolution mode. As described herein, the dual resolution mode may restrict the user's choice of display resolution and display refresh rate to limited and defined two combinations of display resolution and display refresh rate to quickly toggle between. In contrast, selection of the user selected resolution mode presents a second user selected resolution mode OSD menu for the user to choose from a plurality of one or both of available display resolutions and available display refresh rates in condensed lists. Both streamline the resolution selection process onboard with digital display device. The user selected resolution mode in embodiments herein may streamline this selection process by automatically jumping to a user selected resolution mode OSD menu from the control guide to list available display resolutions and immediately limits the list of available display refresh rates available for user selection to those that are compatible with the user-selected display resolution onboard that digital display device, thereby significantly decreasing the number of steps necessary for a user to change display resolution or display refresh rate in comparison to existing systems.

In an embodiment in which the selects the dual resolution mode, the user may select a dual rapid monitor setting toggle switch via indication on the OSD control guide for switching between two commonly used combinations of display resolutions and display refresh rates. The use of defined combinations of display resolutions and refresh rates herein allows for rapid switching between two commonly used combinations of display resolutions and display refresh rates onboard the digital display device, such as those supported by popular gaming software applications, popular video streaming services, or popular gaming platforms, for example. In a specific example, the dual rapid monitor setting toggle switch actuation via the OSD control guide allows a user to toggle between a first combination that includes a dual resolution mode display resolution of 4K, or 3840 pixels by 2160 pixels, and a dual resolution mode display refresh rate of 165 Hz, and a second combination that includes a dual resolution mode display resolution of full high-definition (FHD), or 1920 pixels by 1080 pixels, and a dual resolution mode display refresh rate of 330 Hz. The dual resolution mode in embodiments herein may restrict the user's choice of display resolution and display refresh rate to limited and defined combinations of display resolution and display refresh rate in order to allow for automatic and near-immediate (e.g., less than one second) switching of display resolution and refresh rate via a simple toggle input with the manual joystick directional device onboard the digital display device. This may improve user experience when operating such popular gaming software applications, platforms, or video streaming services with the standalone digital display device allowing quick switching of resolution and refresh rate without delay or several steps. In such a way, the DSP hardware controller of the digital display device may execute machine readable code instructions of the rapid manual monitor display mode adjustment system to limit the number of steps necessary for the user to select an updated display resolution and an updated display refresh rate to the single step selection of the dual rapid monitor setting toggle switch input at the manual joystick directional device as guided in the dual resolution mode OSD control guide.

In embodiments in which the rapid manual monitor display mode adjustment system is set to user selected resolution mode by selection with a manual joystick directional device input via the OSD control guide, the DSP hardware controller of the digital display device may execute machine readable code instructions of the rapid manual monitor display mode adjustment system to display the first or current display resolution within a list of available alternative display resolutions shown in a user selected resolution mode OSD menu. The rapid manual display mode adjustment OSD may allow the user to select from a plurality of available display resolutions and a plurality of display refresh rates, rather than automatically toggling between preset display resolutions and preset display refresh rates, as described directly above in dual resolution mode. The user in embodiments describing the user selected resolution mode may select the current or an updated display resolution from a list of available display resolutions supported by the digital display device firmware within the user selected resolution mode OSD menu, via the manual joystick directional device, such as a joystick, on the digital display device. The user-selected display resolution may be the current display resolution or a user-selected new or updated display resolution at which the digital display is not currently operating.

The DSP hardware controller of the digital display device operating in user selected resolution mode in embodiments herein may also execute machine readable code instructions of the rapid manual monitor display mode adjustment system to display a list of available alternative display refresh rates that are compatible with the user-selected display resolution within the user selected resolution mode OSD menu. In such a way, the user selected resolution mode in embodiments herein may streamline this selection process by automatically jumping to the user selected resolution mode OSD menu that lists all available display resolutions and limits the list of available display refresh rates available for user selection to those that are compatible with the user-selected display resolution for that digital display device. This automatic narrowing of available options onboard the digital display device may significantly decrease the number of steps necessary for a user to change display resolution or display refresh rate in comparison to existing systems that require the user to navigate through several steps of a settings menu operated at a software application of the operably connected information handling system and reference to EDID data received from the standalone digital display device.

Upon selection of one or both of an updated display resolution or an updated display refresh rate in either dual resolution mode or user selected resolution mode, the DSP hardware controller of the digital display device may execute machine readable code instructions of the rapid manual monitor display mode adjustment system to coordinate updating of the display resolution or display refresh rate at both the GPU of the operably coupled information handling systems and at the digital display device using a simplified and quick solution. The DSP hardware controller of the digital display device in some embodiments herein may execute machine readable code instructions of the rapid manual monitor display mode adjustment system to generate a notification of a user-requested switch in settings of the updated display resolution or the updated refresh rate using a single byte rapid display mode adjustment code determined from a resolution and refresh rate bit mapping table. For example, such a resolution and refresh rate bit mapping table may reserve the first four bits of the single byte rapid display mode adjustment code for identification of the updated display refresh rate, and the second four bits of the single byte rapid display mode adjustment code for identification of the updated display resolution. Further, the value given within the reserved bits may be associated within the resolution and refresh rate bit mapping table with specific display resolutions and display refresh rates to be used with the GPU-generated video signal from the operatively coupled information handling system. For example, a value of 0x0000 given within the second four bits of the single byte rapid display mode adjustment code may be associated within the resolution and refresh rate bit mapping table with a display resolution of 4K or 3840 pixels by 2160 pixels. As another example, a value of 0x0011 given within the first four bits of the single byte rapid display mode adjustment code may be associated within the resolution and refresh rate bit mapping table with a display refresh rate of 165 Hz. Such a resolution and refresh rate bit mapping table in embodiments herein may be stored at the display device memory of the digital display device, for access by the rapid manual monitor display mode adjustment system, and at a memory of the information handling system, for access by the monitor management software application.

The DSP hardware controller of the digital display device may execute machine readable code instructions of the rapid manual monitor display mode adjustment system to notify the monitor management software application operating within the OS of the operably connected information handling system with the single byte rapid display mode adjustment code of the user-requested switch in the GPU-generated video signal settings from the first display resolution and the first display refresh rate to the updated display resolution and the updated display refresh rate, respectively. In some embodiments herein, this may take the form of the single byte rapid display mode adjustment code for the updated display resolution and the updated display refresh rate described directly above. Upon receipt of such a notification at the monitor management software application of the single byte rapid display mode adjustment code in embodiments herein, the hardware processor of the information handling system operatively coupled to the digital display device may execute machine readable code instructions of the monitor management software application to switch the GPU and OS to use the updated display resolution and the updated display refresh rate. The monitor management software application may generate and transmit an instruction, via an application programming interface (API) call to the information handling system graphics processing unit (GPU), to switch the GPU desktop mode and the GPU active signal mode from the first display resolution and the first display refresh rate to the updated display resolution and the updated display refresh rate, respectively. This may involve the monitor management software application identifying the updated display resolution or updated display refresh rate by referencing the stored resolution and refresh rate bit mapping table described above.

The GPU of the operably coupled information handling system in embodiments herein may change the video output desktop mode and the video output active signal mode to the updated display resolution and the updated display refresh rate, respectively, and further notify the display device firmware of such a switch. In response to such a notification from the GPU, the DSP hardware controller of the digital display device may execute machine readable code instructions of the display device firmware to switch from the first display resolution and the first display refresh rate to the updated display resolution and the updated display refresh rate, respectively, for the display of the incoming video signal from the GPU. In such a way, the updating of the display resolution or display refresh rate at both the GPU and the display device may be coordinated from onboard the digital display device in embodiments herein using a simplified and quick solution that requires fewer transmitted communications or instructions, potentially omits the communication of an EDID, and significantly decreases the size and transmission time of such a communication using the single byte rapid display mode adjustment code.

Turning now to the figures, FIG. 1 illustrates an information handling system 100 similar to the information handling systems according to several aspects of the present disclosure. As described herein, a digital display device 120 in an embodiment may operatively couple to an information handling system 100 to act as a monitor or external display for the information handling system 100. When operatively coupled, the standalone digital display device 120 may receive a video signal from such an operatively coupled information handling system 100 either wirelessly via communication between a wireless interface adapter 130 of the information handling system 100 and digital display device wireless interface adapter 160 of the digital display device 120, or through a wired communication port such as a universal serial bus type-C (USB-C) port, Thunderbolt® port, high definition multimedia interface (HDMI) port, DisplayPort® (DP), or mini-DP®, for example. In an embodiment, a display hardware controller such as digital signal processing (DSP) hardware controller 121 of the digital display device 120 executing code instructions of a rapid manual monitor display mode adjustment system 125 may streamline the process by which a user adjusts the display resolution and display refresh rates and the coordination of such an adjustment between a graphics processing unit (GPU) 106 of the operably connected information handling system 100 that generates the video signal and the digital display device 120 that displays the received video signal.

The DSP hardware controller 121 of the digital display device 120 executing machine readable code instructions 128 of the rapid manual monitor display mode adjustment system 125 in an embodiment may shift control of adjustments to display resolution and display refresh rates onboard the digital display device 120 to allow the user to manually select new display resolution or new display refresh rate from a direct-access rapid manual display mode adjustment on screen display (OSD) control guide 160 that is streamlined to prompt the user to select either a dual resolution mode or a user selected resolution mode with a manual joystick directional device 150. When the dual resolution mode is selected via input from the manual joystick directional device 150, the user may toggle between two combinations of popularly used display resolutions and display refresh rates with the manual joystick directional device 150. When the user selected resolution mode is selected via input from the manual joystick directional device 150, the user is prompted with direct-access user selected resolution mode OSD menu 180 on display panel 123 to then select from a condensed list of available display resolutions and available display refresh rates. In various embodiments herein, the DSP hardware controller 121 of the digital display device 120 executing code instructions of the rapid manual monitor display mode adjustment system 125 supports both a dual resolution mode that allows users to choose between two combinations of display resolutions (e.g., 4K or full high definition (FHD)) and display refresh rates (e.g., 165 HZ or 330 Hz) commonly supported by popular gaming software applications 111, gaming platforms, or video streaming services 118, and a user selected resolution mode that allows the user to immediately choose from a slightly expanded list of available display resolutions and a limited list of display refresh rates that are compatible with the user-selected display resolution from onboard the digital display device 120. In all such embodiments, the DSP hardware controller 121 of the digital display device 120 executing machine readable code instructions 128 of the rapid manual monitor display mode adjustment system 125 decreases the number of steps required and time consumed in adjusting the display resolution and display refresh rate for the video signal generated at the GPU 106 and displayed, via the display panel 123 of the digital display device 120 as compared to previous systems requiring access through an OS driven menu at an operably coupled information handling system 100. Execution of machine readable code instructions 128 of the rapid manual monitor display mode adjustment system 125 further improves the method of coordinating such an adjustment between the GPU 106 and the digital display device firmware 124 by reducing required data exchange and by use of a quick single byte rapid display mode adjustment code in embodiments herein.

In an embodiments, the DSP hardware controller 121 of the digital display device 120 executing machine readable code instructions of the display device firmware 124 to display a video signal at a first display resolution (e.g., 4K or 3840 pixels by 2160 pixels) and a first display refresh rate (e.g., 165 Hz), that match the resolution and refresh rate respectively, of the video signal received from an operably connected information handling system 100, as set by GPU 106. The DSP hardware controller 121 of the digital display device 120 executes code instructions of the rapid manual monitor display mode adjustment system 125 to poll the digital display device firmware 124 to determine a current display resolution and a current display refresh rate and to determine a current first resolution mode and first refresh rate and whether those settings are within one of the dual resolution mode options or require a user selected resolution mode. The user in an embodiment may prompt the digital display device 120 rapid manual display mode adjustment on screen display (OSD) control guide 160 through interaction with a manual joystick directional device 150 housed within the digital display device housing. Further, the user may select, in the user selected resolution mode, specific resolution or refresh rates via use of the manual joystick directional device 150 on the digital display device 120 via a user selected resolution mode OSD menu 180 in embodiments herein.

The DSP hardware controller 121 of the digital display device 120 in embodiments may execute machine readable code instructions 128 of the rapid manual monitor display mode adjustment system 125 to display the rapid manual display mode adjustment OSD control guide 160, via the display panel 123, to allow a user to select between a dual resolution mode and a user selected resolution mode. As described herein, the dual resolution mode in an embodiment may restrict the user's choice of display resolution and display refresh rate to limited and defined combinations of display resolution and display refresh rate. In contrast, the user selected resolution mode selected via the rapid manual display mode adjustment OSD control guide 160 in an embodiment may present a user selected resolution mode OSD menu 180, via the display panel 123, to allow the user to choose from a plurality of one or both of available display resolutions and available display refresh rates. The user selected resolution mode in embodiments herein may streamline this selection process by automatically jumping to a user selected resolution mode OSD menu 180 that automatically lists all available display resolutions and limits the list of available display refresh rates available for user selection onboard the standalone digital display device 120 without exchange of EDID data. The listed available display resolutions and available display refresh rates are limited to combinations in the user selected resolution mode OSD menu 180 for those that are compatible with digital display device 120, thereby significantly decreasing the number of steps necessary for a user to change display resolution or display refresh rate in comparison to existing systems.

In an embodiment in which the rapid manual monitor display mode adjustment system 125 is set to dual resolution mode, the DSP hardware controller 121 of the digital display device 120 executing code instructions of the rapid manual monitor display mode adjustment system 125 to display rapid manual display mode adjustment OSD control guide 160 via the display panel 123 of the digital display device 120 for rapid switching between two commonly used combinations of display resolutions and display refresh rates, as described in greater detail below with respect embodiments herein. The use of defined combinations of resolutions and refresh rates in the dual resolution mode herein allows for rapid switching between two commonly used combinations of display resolutions and display refresh rates, such as those supported by popular gaming software applications, popular video streaming services, or popular gaming platforms, for example. In such a way, the DSP hardware controller 121 executing machine readable code instructions 128 of the rapid manual monitor display mode adjustment system 125 onboard the digital display device 120 reduces the number of steps necessary for the user to select an updated display resolution and an updated display refresh rate to the single step selection of the dual rapid monitor setting toggle switch using the manual joystick directional device 150 pursuant to rapid manual display mode adjustment OSD control guide 160.

Figure 4A:
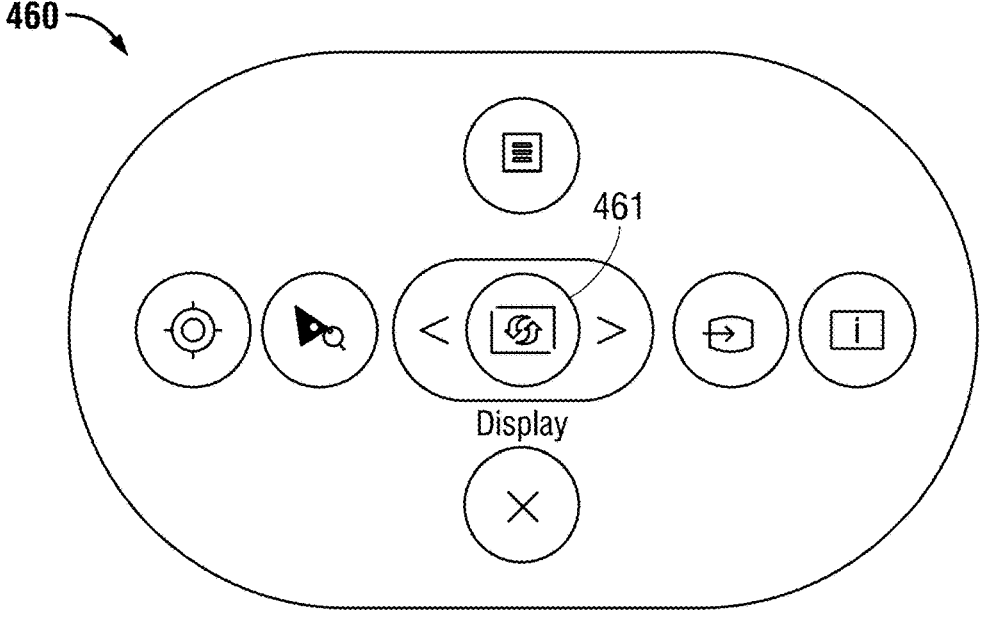
FIG. 4A is a graphical diagram illustrating the rapid manual display mode adjustment OSD control guide displaying an icon for selecting a user selection mode to select particular display resolutions and refresh rates by a manual joystick directional device onboard the digital display device according to an embodiment of the present disclosure.
Figure 4B:
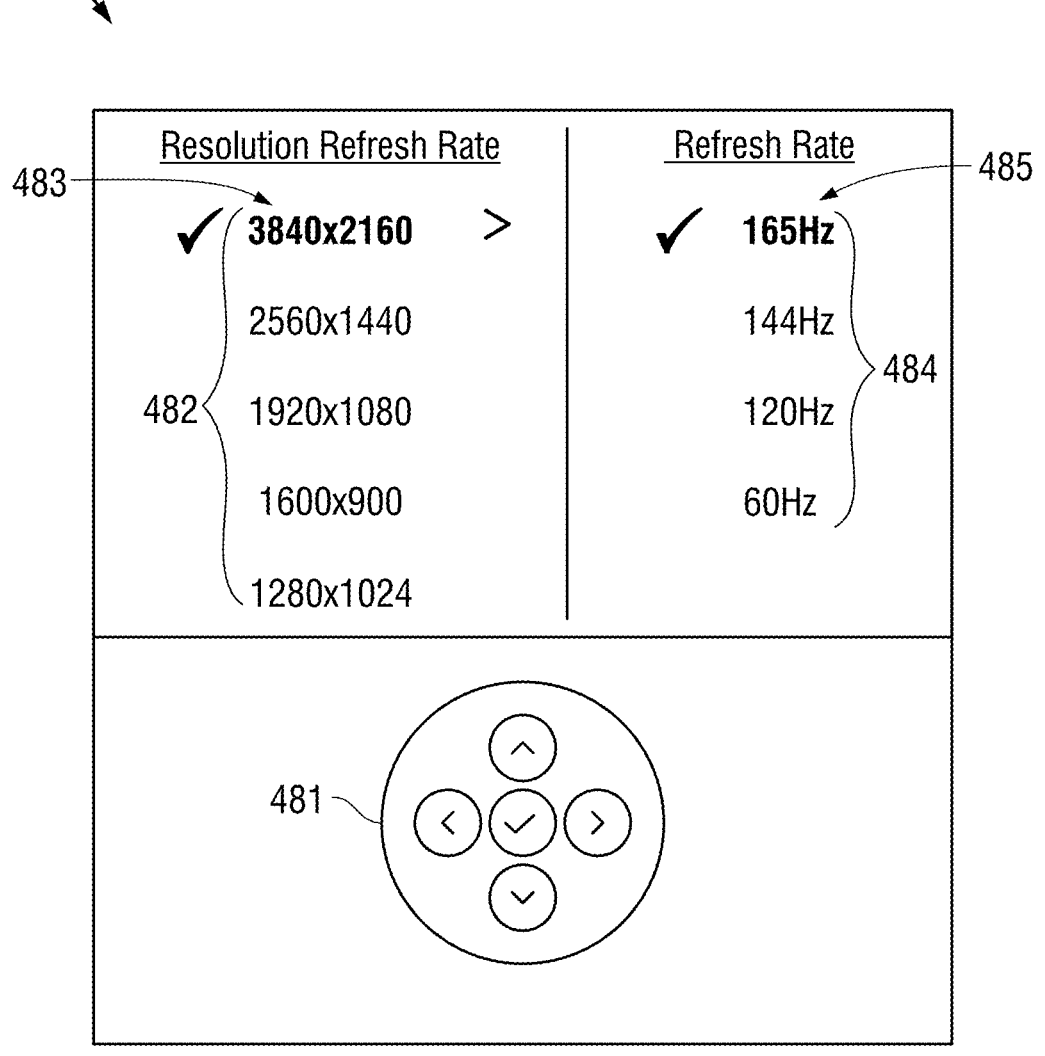
FIG. 4B is a graphical diagram illustrating a user selected resolution mode OSD menu in the user selection mode for user selection from a condensed list of available display resolutions and display refresh rates by a manual joystick directional device onboard the digital display device according to an embodiment of the present disclosure.

In embodiments in which the rapid manual monitor display mode adjustment system 125 is set to user selected resolution mode, the DSP hardware controller 121 of the digital display device 120 executing code instructions of the rapid manual monitor display mode adjustment system 125 to display the first or current display resolution within a list of available alternative display resolutions shown in a user selected resolution mode OSD menu 180, as described in greater detail below with respect to FIGS. 4A, 4B, and 5. The user selected resolution mode OSD menu may allow the user to select from a plurality of available display resolutions and a plurality of display refresh rates via navigation with the manual joystick directional device 150, rather than actuating a toggle switch function for toggling between dual preset display resolutions and preset display refresh rates, as described directly above in dual resolution mode. The DSP hardware controller 121 of the digital display device 120 operating in user selected resolution mode in an embodiment may also execute machine readable code instructions of the rapid manual monitor display mode adjustment system 125 to display a list of available alternative display refresh rates that are compatible with the user-selected display resolution within the user selected resolution mode OSD menu 180. In such a way, the user selected resolution mode may streamline this selection process by automatically jumping to the user selected resolution mode OSD menu 180, upon selection via the rapid manual display mode adjustment OSD control guide 160, to list all available display resolutions and available display refresh rates for user selection of refresh rates compatible with the user-selected display resolution available onboard that digital display device 120. This automatic narrowing of available options may significantly decrease the number of steps necessary for a user and for the digital display device 120 and operatively coupled information handling system 100 to change display resolution or display refresh rate in comparison to existing systems that require the user to navigate through several steps of a settings menu operated at a software application of the operably connected information handling system and steps for exchange of different data between it and the digital display device.

Upon selection of one or both of an updated display resolution or an updated display refresh rate in either dual resolution mode or user selected resolution mode onboard the digital display device 120, the DSP hardware controller 121 of the digital display device 120 executing machine readable code instructions of the rapid manual monitor display mode adjustment system 125 will coordinate updating of the display resolution or display refresh rate at both the GPU 106 at the information handling system 100 and the display device 120 using a simplified and quick solution. The DSP hardware controller 121 of the digital display device 120 in some embodiments may execute machine readable code instructions of the rapid manual monitor display mode adjustment system 125 to generate notification code for the user-requested switch in settings of the GPU-generated video signal to the updated display resolution or the updated refresh rate using a single byte rapid display mode adjustment code determined from a resolution and refresh rate bit mapping table 129. For example, such a resolution and refresh rate bit mapping table 129 may reserve the first four bits of the single byte rapid display mode adjustment code for identification of the updated refresh rate, and the second four bits of the single byte rapid display mode adjustment code for identification of the updated resolution. Further, the value given within the reserved bits may be associated within the resolution and refresh rate bit mapping table with specific display resolutions and display refresh rates. This single byte rapid display mode adjustment code may be quickly and easily transmitted to the GPU 106 and OS 113 at the information handling system 100 upon selection of updated resolution and refresh rate onboard the digital display device 120 without need for exchange of EDID information and then selection via OS 113 software menu. For example, as shown in the example Table 1 below, a value of 0x0000 given within the second four bits of the single byte rapid display mode adjustment code may be associated within the resolution and refresh rate bit mapping table 129 with a display resolution of 4K or 3840 pixels by 2160 pixels. As another example, a value of 0x0011 given within the first four bits of the single byte rapid display mode adjustment code may be associated within the resolution and refresh rate bit mapping table 129 with a display refresh rate of 165 Hz. Such a resolution and refresh rate bit mapping table 129 in an embodiment may be stored at the display device memory 126 of the digital display device 120, for access by the rapid manual monitor display mode adjustment system 125, and at a memory 103, 15, or 115, for example, of the information handling system 100, for access by the monitor management software application 116.

TABLE 1

| Resolution (pixel by pixel) | Code for Bits 7-4 (High Nibble) |
| --- | --- |
| 3840 × 2160 | 0 × 0000 |
| 2560 × 1440 | 0 × 0001 |
| 1920 × 1080 | 0 × 0010 |
| 1600 × 900 | 0 × 0011 |
| 1280 × 1024 | 0 × 0100 |

| Refresh Rate (Hz) | Code for Bits 0-3 (Low Nibble) |
| --- | --- |
| 60 | 0 × 0000 |
| 120 | 0 × 0001 |

TABLE 1-continued

| | |
| --- | --- |
| 144 | 0 × 0010 |
| 165 | 0 × 0011 |
| 240 | 0 × 0100 |
| 330 | 0 × 0101 |

The DSP hardware controller 121 of the digital display device 120 may execute machine readable code instructions of the rapid manual monitor display mode adjustment system 125 to notify the monitor management software application 116 operating within the OS 113 of the operably connected information handling system 100 of the user-requested switch in the GPU-generated video signal settings from the first display resolution and the first display refresh rate to the updated display resolution and the updated display refresh rate, respectively. In some embodiments herein, this may take the form of the single byte rapid display mode adjustment code described directly above. Upon receipt of the single byte rapid display mode adjustment code at the monitor management software application 116 in an embodiment, the hardware processor 101 of the information handling system 100 operatively coupled to the digital display device 120 may execute machine readable code instructions of the monitor management software application 116 to automatically generate and transmit an instruction, via an application programming interface (API) call to the information handling system 100 GPU 106, to switch the GPU desktop mode and the GPU active signal mode from the first display resolution and the first display refresh rate to the updated display resolution and the updated display refresh rate, respectively. This may involve the monitor management software application 116 identifying the updated display resolution or updated display refresh rate by referencing the stored resolution and refresh rate bit mapping table 129 described above. The OS 113 need not commence execution of a monitor adjustment GUI or loading data from a retrieved EDID for the user at the information handling system 100.

The GPU 106 of the operably coupled information handling system 100 in an embodiment may change the video output desktop mode and the video output active signal mode to the updated display resolution and the updated display refresh rate, respectively, and further notify the display device firmware 124 of such a switch to the display device firmware 124 may receive GPU-generated video signals at the updated resolution and updated refresh rate. In response to such a notification from the GPU 106, the DSP hardware controller 121 of the digital display device 120 executing code instructions of the rapid manual monitor display mode adjustment system 125 may switch from the first display resolution and the first display refresh rate to the updated display resolution and the updated display refresh rate, respectively, for the display of the incoming GPU-generated video signal from the GPU 106, via the display panel 123. In such a way, the updating of the display resolution or display refresh rate at both the GPU 106 and the display device 120 may be coordinated using a simplified and quick solution that requires fewer transmitted communicated or instructions, potentially omits the communication of an EDID, and significantly decreases the size and transmission time of such a communication using the single byte rapid display mode adjustment code.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), a graphics processing unit (GPU) 106, other hardware controllers, or any combination thereof. Additional components of the information handling system 100 may include one or more storage devices such as static memory 105 or drive unit 115. The information handling system 100 may include or interface with one or more communications ports for communicating with external devices, as well as one or more input/output (IO) devices 199, a video/graphics digital display device 120, or any combination thereof. Digital display devices 120 may include an external, standalone digital display device operatively coupled to the information handling system 100 in embodiments herein. Portions of an information handling system 100 may themselves be considered information handling systems 100.

The digital display device 120 may also include digital display device memory 126, (volatile (e.g., random-access memory, etc.), or static, nonvolatile (read-only memory, flash memory etc.) or any combination thereof). Digital display device 120 may include memory 126, which may be volatile or nonvolatile memory (read-only memory, flash memory etc.) or any combination thereof storing machine readable code instructions (e.g., software or firmware algorithms), parameters, and profiles 128 executable by the hardware controller 121. One or more hardware processing resources may also be included within digital display device 120, such as a display hardware controller 121 that may be a DSP, microcontroller, other hardware controllers, or any combination thereof. In other embodiments, the display hardware controller 121 may comprise a scalar central processing unit (CPU), or timing controller (TCON).

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. The digital display device 120 may execute machine readable code instructions (e.g., software or firmware algorithms), parameters, and profiles 128 that may operate according to various embodiments herein. In some embodiments, it is understood any or all portions of machine readable code instructions (e.g., software or firmware algorithms), parameters, and profiles 114 or 128 may operate on a plurality of information handling systems 100 and on digital display device 120.

The information handling system 100 may include the hardware processor 102 such as a central processing unit (CPU) or other hardware processing resources on information handling system 100. The digital display device 120 may include hardware processing resources such as a display hardware controller 121, such as DSP, timing controller (TCON), or other hardware controller. Any of the hardware processing resources may operate to execute machine readable code instructions 114 or 128 that are either firmware or software code. For example, the display hardware controller 121 may execute machine readable digital display device firmware 124 or rapid manual monitor display mode adjustment system 125 according to embodiments herein. The digital display device 120 in some embodiments may include a separate hardware controller 121, such as a DSP hardware controller, to execute machine readable code instructions 12 of digital display device firmware 124 or rapid manual monitor display mode adjustment system 125 in embodiments herein. In such an embodiment, the digital display device 120 includes a hardware controller 121 that may comprise a digital signal processor (DSP), a video scaler hardware processor, a TCON, or other on-board hardware processor on the digital display device 120. The hardware processor 102 in the information handling system 100 may comprise a vector CPU or multi-vector CPU or may be a graphics processing unit (GPU) 106 or other hardware processing resource.

Moreover, the information handling system 100 may include memory such as main memory 103, static memory 105, and disk drive unit 115 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, GPU 106, or any other hardware processing device. The information handling system 100 may also include one or more buses 117 operable to transmit communications between the various hardware components such as any combination of various I/O devices 199, as well as between hardware processors 102, GPU 106 or other, the operating system (OS) 113, the basic input/ output system (BIOS) 110, the wireless interface adapter 130, or a radio module 132, among other components described herein. In an embodiment, the hardware processor 102, and/or GPU 106 may execute one or more bus drivers in order to transmit this data between the information handling system 100 and the input/output devices 199 described herein. As described herein, the information handling system 100 further includes a video/graphics digital display device 120. The video/graphics digital display device 120 in an embodiment may function as a liquid crystal display (LCD), an organic light emitting diode (OLED), a flat panel display, or a solid-state display. In embodiments herein, a digital display device 120 having a display screen panel 123 is described. It is appreciated that the video/graphics digital display device 120 may be wired or wireless to be one or more external video/graphics digital display devices 120 that allow a user to increase the display-viewable desktop area by extending the desktop displayed for the information handling system 100 in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (W PAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless A Ps 141 or base stations 142 may be operatively connected to the information handling system 100 or the digital display device 120. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136, and other circuitry of the radio 132, such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100, or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium 112 that includes machine-readable code instructions, parameters, and profiles 114 and a computer-readable medium 127 that includes machine-readable code instructions, parameters, and profiles 128 or receives and executes instructions, parameters, and profiles 114 or 128 responsive to a propagated signal, so that a hardware device connected to a network 140 may communicate voice, video, or data over the network 140. Further, the machine readable code instructions 114 or 128 may be transmitted or received over the network 140 via the network interface device or wireless interface adapter 130. The present disclosure also contemplates machine-readable code instructions, parameters, and profiles 122 executing on a display hardware controller 121 on-board the digital display device 120 and includes machine readable code instructions, parameters, and profiles of digital display device firmware 124 or rapid manual monitor display mode adjustment system 125 to execute the system and methods of the present disclosure.

The information handling system 100 may include a set of instructions 114 of monitor management software application 116 that may be executed to receive data from the digital display device 120 to perform any one or more of the methods or computer-based functions of embodiments disclosed herein. For example, machine readable code instructions 114 may be executed by a hardware processor 102, GPU 106, or any other hardware processing resource and may include software agents, or other aspects or components used to execute the methods and systems described herein. In another example, machine readable code instructions 128 may be executed by a display hardware controller 121 or other hardware processing resource on-board a digital display device 120 for execution of digital display device firmware 124 or rapid manual monitor display mode adjustment system 125 according to parameters and instructions at the digital display device 120 in embodiments herein. Various software modules or firmware modules comprising application machine readable code instructions 114 may be coordinated by an OS 113, and/or via an application programming interface (API) include a unified device API described herein. An example OS 113 may include Windows®, Android®, and other OS types. Example A Pls may include Win 32, Core Java API, or Android APIs. Another API may be used by execution of machine readable code instructions of the monitor management software application 116 at the information handling system 100 receiving the single byte rapid display mode adjustment code from the display hardware controller 121 to modify or adjust to an updated resolution or updated refresh rate at GPU 106 according to embodiments herein.

In an embodiment, the information handling system 100 may include a disk drive unit 115. The disk drive unit 115 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 115 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 115 during execution by the hardware processor 102, or GPU 106 of information handling system 100.

The digital display device 120 may include digital display device memory 126, which may include machine-readable code instructions, parameters, and profiles 128 in which one or more sets of machine-readable code instructions, parameters, and profiles 128 such as firmware or software can be embedded to be executed by the hardware controller 121, or other microcontroller unit to perform the processes described herein. The digital display device memory 126 may also contain space for data storage. Further, the machine-readable code instructions, parameters, and profiles 128 may embody one or more of the methods as described herein. In a particular embodiment, the machine-readable code instructions, parameters, and profiles 128 may reside completely, or at least partially, within the digital display device memory 126 during execution by the hardware controller 121 of the digital display device 120.

Main memory 103, digital display device memory 126, or other memory of the embodiments described herein may contain computer-readable medium (not shown), such as RAM in an example embodiment. An example of main memory 103, or digital display device memory 126 includes random access memory (RAM) such as static RAM (SRAM), dynamic RAM (DRAM), non-volatile RAM (NV-RAM), or the like, read only memory (ROM), another type of memory, or a combination thereof. Static memory 105, or digital display device memory 126 may contain computer-readable medium (not shown), such as NOR or NAND flash memory in some example embodiments. The applications and associated A Pls, for example, may be stored in static memory 105 or on the disk drive unit 115 that may include access to a machine-readable code instructions, parameters, and profiles 114 such as a magnetic disk or flash memory in an example embodiment. Digital display device firmware 124, or rapid manual monitor display mode adjustment system 125, for example, may be stored in digital display device memory 126 in computer readable medium 128 that may include access to a machine-readable code instructions, parameters, and profiles 128 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 115, the hardware processor 102 (e.g., CPU), the GPU 106, a video/graphic digital display device 120, or other wired I/O devices 199 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 or 127 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
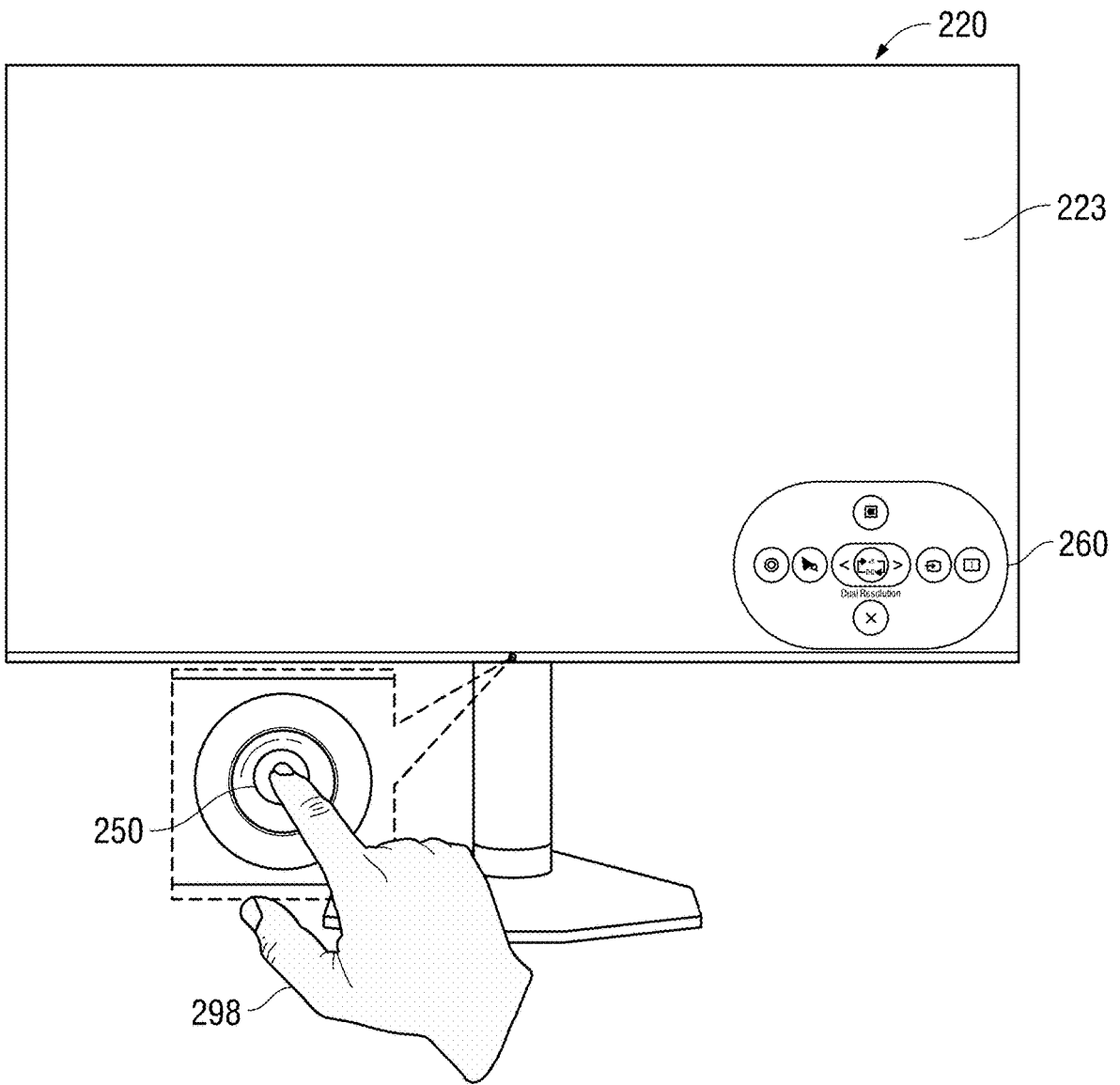
FIG. 2 is a graphical diagram illustrating a standalone digital display device with a manual joystick directional device for user navigation through an on screen display (OSD) control guide or a user selected resolution mode OSD rate menu for rapidly selecting an updated display resolution or refresh rate onboard the digital display device according to an embodiment of the present disclosure.

FIG. 2 is a graphical diagram illustrating a standalone digital display device 220 with a magnified depiction of a manual joystick directional device for user navigation through either a rapid manual display mode adjustment on screen display (OSD) control guide 260 or a user selected resolution mode OSD menu for rapidly selecting an updated display resolution or an updated display refresh rate according to an embodiment of the present disclosure. The user 298 in an embodiment may prompt the rapid manual display mode adjustment OSD control guide 260 through interaction with the manual joystick directional device 250. An example of such a manual joystick directional device 250 in an embodiment may include a joystick, a depressible button, a touchpad, or any known input device used for directional input actuation such as for moving a cursor on the digital display device 220 or selecting from various icons, buttons, tags, or listed words displayed within the rapid manual display mode adjustment OSD control guide 260 or the user selected resolution mode OSD menu (not shown) when a user selected resolution mode is selected.

The user 298 may use the rapid manual display mode adjustment OSD control guide 260 to select between the dual resolution mode or a user selected resolution mode, as described in greater detail below with respect to FIGS. 3 and 4A. The dual resolution mode in an embodiment may restrict the user's choice of two display resolution and display refresh rate defined combinations via toggle selection at the manual joystick directional device 250 and indicated on the rapid manual display mode adjustment OSD control guide 260, as described in greater detail below with respect to FIG. 3. In contrast, the user selected resolution mode in an embodiment may be selected by directional actuation and selection with the manual joystick directional device 250 using the rapid manual display mode adjustment OSD control guide 260 allow the user to choose from a plurality of one or both of available display resolutions and available display refresh rates provided in a subsequent user selected resolution mode OSD menu. The user selected resolution mode in embodiments herein streamline this selection process by automatically jumping to a user selected resolution mode OSD menu, described with respect to FIGS. 4A and 4B below when user selected resolution mode is selected, that automatically lists all available display resolutions and limits the list of available compatible display refresh rates available onboard the digital display device 220 for user selection, thereby significantly decreasing the number of steps necessary for a user to change display resolution or display refresh rate in comparison to existing systems.

Figure 3:
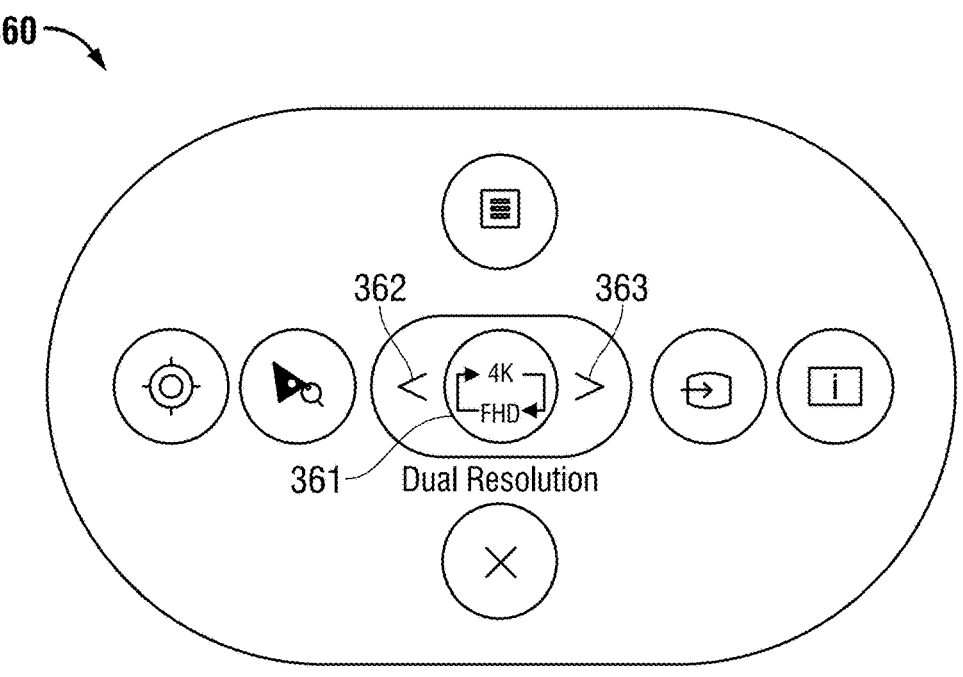
FIG. 3 is a graphical diagram illustrating a rapid manual display mode adjustment OSD control guide displaying an icon for selection of rapid switching between defined combinations of display resolutions and refresh rates by a manual joystick directional device onboard the digital display device according to an embodiment of the present disclosure.

FIG. 3 is a graphical diagram illustrating a rapid manual display mode adjustment OSD control guide that includes a dual rapid monitor setting toggle switch for rapid switching between defined combinations of display resolutions and display refresh rates set for the dual resolution mode according to an embodiment of the present disclosure. Example set dual options for combinations of display resolutions and display refresh rates in the dual resolution mode may include those supported by popular gaming software applications, gaming platforms, or video streaming services. As described herein, user may use the rapid manual display mode adjustment OSD control guide 360 to guide selection between the dual resolution mode or a user selected resolution mode via a dual resolution mode toggle selection button 361 for dual resolution mode in an embodiment. Alternatively, the user may select a left or right arrow 362 or 363 with a manual joystick directional device, respectively, located on either side of a dual resolution mode toggle selection button 361 switch from a dual resolution mode to a user selected resolution mode to browse to the user selected resolution mode to access available display resolution modes at the digital display device. As the user selects the left arrow 362 or the right arrow 363, an icon for a user-selected resolution mode may be depicted instead of the dual resolution mode toggle selection button 361 at the center of the rapid manual display mode adjustment OSD control guide 360 for potential selection by the user.

For example, in the embodiment shown in FIG. 3, the dual resolution mode icon may be shown within the dual resolution mode toggle selection button 361, while in an embodiment described below with respect to FIG. 4A, the user selected resolution mode icon may be displayed as a user selected resolution mode toggle button 461. The user may cause the shift between the dual resolution mode and the user selected resolution mode by selecting the left arrow 361 or the right arrow 362 directionally and selecting via depressing or clicking the dual resolution mode toggle selection button 361 or the user selected resolution mode toggle button 461 with the manual joystick directional device. This may take as few as two or three actuations of a manual joystick directional device for selection by the dual resolution mode or only two to three actuations to automatically access the display resolutions and refresh rates via a user selected resolution mode compatible for this digital display device in embodiments of the present disclosure.

When the dual resolution mode icon is displayed within the dual resolution mode toggle selection button 361 in the center of the rapid manual display mode adjustment OSD control guide 360, the dual resolution mode toggle selection button 361 also serves as a toggle switch that the user may select, via a manual joystick directional device, to rapidly switch between defined set combinations of display resolutions and display refresh rates from the dual resolution mode. In an example embodiment, the dual rapid monitor setting toggle switch 361 may allow a user to toggle between a first set combination that includes a display resolution of 4K, or 3840 pixels by 2160 pixels, and a display refresh rate of 165 Hz, and a second set combination that includes a display resolution of full high-definition (FHD), or 1920 pixels by 1080 pixels, and a display refresh rate of 330 Hz. These are only examples of dual resolution mode set combinations for display resolutions and display refresh rates for quick selection by toggling within dual resolution mode contemplated herein. Other examples may include any set combinations of display resolution or display refresh rates supportable by the digital display device firmware and display panel of the digital display device. Further, any compatible combination of such supported display resolutions and display refresh rates are contemplated herein. The use of defined set combinations of display resolutions and display refresh rates herein allows for rapid switching between two commonly used combinations of display resolutions and display refresh rates, such as those supported by popular gaming software applications, popular video streaming services, or popular gaming platforms, for example. The dual resolution mode in an embodiment may restrict the user's choice of display resolution and display refresh rate to limited and defined set combinations of display resolution and display refresh rate, in order to allow for automatic and near-immediate (e.g., less than one second) switching of display resolution and display refresh rate, which may improve user experience when operating such popular gaming software applications, platforms, or video streaming services.

FIG. 4A is a graphical diagram illustrating a rapid manual display mode adjustment on screen display (OSD) control guide 460 allowing a user to select a user selected resolution mode toggle button 461 for a user selected resolution mode prompting the display of a condensed and streamlined list of available display resolutions and display refresh rates in a according to an embodiment of the present disclosure. The display of a condensed and streamlined list of available display resolutions and display refresh rates available at the digital display device may be presented via a user selected resolution mode OSD menu 480 in FIG. 4B according to an embodiment of the present disclosure. The user in an embodiment may prompt the display of the rapid manual display mode adjustment OSD control guide 460 through interaction with the manual joystick directional device, such as joystick 250 of FIG. 2. The rapid manual display mode adjustment OSD control guide 460 in an embodiment may be displayed on the display panel of the digital display device to allow the user to select user selected resolution mode via the user selected resolution mode toggle button 461 in the center of the rapid display mode adjustment OSD control guide 460 while it is displaying a user selected display resolution icon, as shown in FIG. 4A, to automatically prompt display of a condensed and streamlined list of available display resolutions and display refresh rates. This display of a condensed and streamlined list of available display resolutions and refresh rates compatible with this digital display device is automatically presented in a user selected resolution mode OSD menu 480 to select an updated display resolution or an updated display refresh rate, as described directly below with respect to FIG. 4B.

FIG. 4B is a graphical diagram illustrating a user selected resolution mode OSD menu for a user selected resolution mode to automatically display of a condensed and streamlined list of available display resolutions and display refresh rates compatible onboard a digital display device for user selection according to an embodiment of the present disclosure. In an embodiment in which the user has selected the user selected resolution mode toggle button 461 of FIG. 4A above while it is displaying the user selected resolution mode icon, the DSP hardware controller of the digital display device may execute machine readable code instructions of the rapid manual monitor display mode adjustment system to display the user selected resolution mode OSD menu 480. This may include the display of the current first display resolution 483 (e.g., 4K resolution of 3840 pixels by 2160 pixels) within a list of available alternative display resolutions 482 as polled from current settings. The current first display resolution 483 may be depicted via highlighting, graying out, check mark, or other designation in the user selected resolution mode OSD menu 480. The user in an embodiment may select the current or an updated display resolution, such as display resolution 483 which may be the current display resolution or a user-selected new or updated display resolution, from a list of available display resolutions 483 supported by digital display device firmware within the user selected resolution mode OSD menu 480, via the manual joystick directional device. More specifically, the user may manipulate the joystick 250 of FIG. 2 above to select one or more directional arrows or a selection button within an OSD navigation tool 481 to navigate through and select one of the available display resolutions (e.g., 483) in list 482 of the user selected resolution mode OSD menu 480 without requiring navigation of OS menus or exchange of EDID information at an operatively coupled information handling system saving steps and time to exchange and load resolution and refresh rate data and selection of updated settings.

Upon selection by the user of one of the display resolutions given within the list 482 in the user selected resolution mode OSD menu 480, such as display resolution 483, the DSP hardware controller of the digital display device in an embodiment may execute machine readable code instructions of the rapid manual monitor display mode adjustment system to also automatically display a list of available alternative display refresh rates 484 that are compatible with the user-selected display resolution 483 onboard the digital display device within the second portion of the user selected resolution mode OSD menu 480. The current first display refresh rate 485 may be depicted via highlighting, graying out, check mark, or other designation in the user selected resolution mode OSD menu 480. In such a way, the user selected resolution mode in embodiments herein may streamline this selection process by automatically jumping to the user selected resolution mode OSD menu 480 that automatically lists all available display resolutions and limits the list of available display refresh rates available for user selection to those that are compatible with the user-selected display resolution onboard that digital display device. This automatic narrowing of available options immediately onboard the digital display device being adjusted may significantly decrease the number of steps necessary for a user to change display resolution or display refresh rate in comparison to existing systems that require the user to navigate through several steps of a settings menu operated at a software application of the operably connected information handling system. Further, in contrast to the dual resolution mode described above with respect to FIG. 3, the user selected resolution mode OSD menu 480 may allow the user to select from a plurality of available display resolutions 482 and a plurality of display refresh rates 484, rather than automatically toggling between determined and restricted combinations of display resolution and display refresh rate, but still remain a quicker selection tool for fast adjustments to the resolution and refresh rates onboard the digital display device in embodiments herein.

FIG. 5 is a flow diagram illustrating a method of a digital signal processor (DSP) of a digital display device executing machine readable code instructions of a rapid manual monitor display mode adjustment system to streamline the process by which the user adjusts the display resolution and display refresh rates according to an embodiment of the present disclosure. As described herein, a DSP hardware controller of a digital display device executing code instructions of a rapid manual monitor display mode adjustment system onboard a digital display device may streamline the process by which the user adjusts the display resolution and display refresh rates and the coordination of such an adjustment between the GPU at an operatively coupled information handling system and that digital display device. This may decrease the amount of time required to perform such an adjustment, improving user experience during operation of gaming software applications, gaming platforms, or video streaming services, for example.

At block 502, a digital signal processor (DSP) of the digital display device may execute machine readable code instructions of the digital display device firmware in an embodiment to display video at a first display resolution and a first display refresh rate that match the resolution and refresh rate, respectively, of a video signal received from an operably connected information handling system, as set by a graphics processing unit (GPU) of the information handling system. For example, a digital display device firmware may be set to display an incoming GPU-generated video signal at a first display resolution of 4K or 3840 pixels by 2160 pixels, and at a first display refresh rate of 165 Hz.

The DSP hardware controller of the digital display device in an embodiment at block 504 may execute machine readable code instructions of a rapid manual monitor display mode adjustment system to poll the digital display device firmware to determine a current first display resolution and a current first display refresh rate. For example, in an embodiment described with respect to FIG. 1, the DSP hardware controller 121 of the digital display device 120 executing code instructions of the rapid manual monitor display mode adjustment system 125 to poll the digital display device firmware 124 to determine a current display resolution and a current display refresh rate.

The user in an embodiment at block 506 may prompt a rapid manual display mode adjustment OSD control guide on the digital display device through interaction with the manual joystick directional device. For example, in an embodiment described with respect to FIG. 2, the user 298 may prompt the rapid manual display mode adjustment OSD control guide 260 to be displayed on the digital display device 220 rapid manual display mode through interaction with the manual joystick directional device 250. The manual joystick directional device 250 in an embodiment may incorporated within or operably connected to a housing for the digital display device 220.

At block 508, in an embodiment the DSP hardware controller of the digital display device may execute machine readable code instructions of the rapid manual monitor display mode adjustment system to display a rapid manual display mode adjustment OSD control guide, via the display panel of the digital display device. For example, in an embodiment described with respect to FIG. 3, the DSP hardware controller of the digital display device may execute machine readable code instructions of the rapid manual monitor display mode adjustment system to display a rapid manual display mode adjustment OSD control guide 360, via the display panel of the digital display device, for selecting between a dual resolution mode and a user selected resolution mode. As described herein, the dual resolution mode in an embodiment may restrict the user's choice of display resolution and display refresh rate to two limited and defined set combinations of display resolution and display refresh rate. In contrast, the user selected resolution mode in an embodiment may allow the user to choose from a plurality of one or both of available display resolutions and available display refresh rates compatible onboard that digital display device. The user selected resolution mode in embodiments herein may streamline this selection process by automatically jumping to a user selected resolution mode OSD menu that automatically lists all available display resolutions and limits the list of available display refresh rates available for user selection to those that are compatible with the user-selected display resolution at this digital display device, thereby significantly decreasing the number of steps necessary for a user to change display resolution or display refresh rate in comparison to existing systems.

The DSP hardware controller of the digital display device in an embodiment at block 510 may execute machine readable code instructions of the rapid manual monitor display mode adjustment system to determine whether the user has selected the dual resolution mode or a user selected resolution mode. As described above in an embodiment with respect to FIG. 3, the user may select a left or right arrow 362 or 363, respectively, located on either side of a dual resolution mode toggle selection button 361 in the center of a instructions of the rapid manual display mode adjustment OSD control guide 360 to browse between the dual resolution mode and user selected resolution mode. As the user selects the left arrow 362 or the right arrow 363, an icon for a different available display resolution mode may be depicted within the dual resolution mode toggle selection button 361 for potential selection by the user. For example, in the embodiment shown in FIG. 3, the dual resolution mode icon may be shown within the dual resolution mode toggle selection button 361, while in an embodiment described with respect to FIG. 4A, the user selected resolution mode icon may be displayed within the user selected resolution mode toggle button 461. The user may cause the shift in icons displayed as shown in FIGS. 3 and 4A by selecting the left arrow 361 or the right arrow 362, via depressing or clicking with the manual joystick directional device. The user may further select either the dual resolution mode or the user selected resolution mode by depressing or clicking on the icon for that mode when it is displayed within the dual resolution mode toggle selection button 361 or user selected resolution mode toggle button 461, respectively. If the user has selected the dual resolution mode, the method may proceed to block 512 to automatically toggle between two combinations of determined display resolutions and determined display refresh rates. If the user has selected the user selected resolution mode, the method may proceed to block 514 to allow the user to navigate a condensed and streamlined list of resolutions or refresh rates on the user selected resolution mode OSD menu to select an updated display resolution or an updated display refresh rate.

The user in an embodiment may select the dual resolution mode toggle selection button in the center of the rapid manual display mode adjustment OSD control guide at block 512, via a manual joystick directional device, to rapidly switch between two defined display resolution and display refresh rate combinations. The use of defined combinations of display resolutions and refresh rates herein allows for rapid switching between two commonly used combinations of display resolutions and display refresh rates, such as those supported by popular gaming software applications, popular video streaming services, or popular gaming platforms, for example. For example, in an embodiment described with respect to FIG. 3, the user may select dual resolution mode toggle selection button 361 in the rapid manual display mode adjustment OSD control guide while the dual resolution mode icon is shown, via a manual joystick directional device, such as a joystick, to rapidly switch between defined combinations of display resolutions and display refresh rates. In an example embodiment, the dual resolution mode toggle selection button 361 while it is showing the dual resolution mode icon may allow a user to toggle between a first set resolution and refresh rate combination, for example a display resolution of 4K (i.e., 3840 pixels by 2160 pixels) and a display refresh rate of 165 Hz, and a second set resolution and refresh rate combination, for example a display resolution of full high-definition (FHD) (i.e., 1920 pixels by 1080 pixels) and a display refresh rate of 330 Hz. The dual resolution mode in an embodiment may restrict the user's choice of display resolution and display refresh rate to two or three limited and defined combinations of display resolution and display refresh rate, in order to allow for automatic and near-immediate (e.g., less than one second) switching of display resolution and display refresh rate via quick toggle actuation of the manual joystick directional device. This expedient adjustment among the set combinations of resolutions and refresh rates onboard the digital display device may improve user experience when operating such popular gaming software applications, platforms, or video streaming services. The method may then proceed to block 520 to determine whether the user has selected to update the display resolution or the display refresh rate via the user actuation of the toggle function of the manual joystick directional device in dual resolution mode.

Returning to block 514, in an embodiment in which the user has selected the user selected resolution mode, the DSP hardware controller of the digital display device may execute machine readable code instructions of the rapid manual monitor display mode adjustment system to display a user selected resolution mode OSD menu with the current first display resolution highlighted or identified within a list of available alternative display resolutions compatible for that digital display device. In an embodiment, the user selected resolution mode OSD menu may allow the user to select from a plurality of available display resolutions and a plurality of display refresh rates, rather than automatically toggling between the preset combinations of display resolutions and display refresh rates of the dual resolution mode, as described above with respect to blocks 510 and 512. For example, in an embodiment described with respect to FIG. 4B, the DSP hardware controller of the digital display device may execute machine readable code instructions of the rapid manual monitor display mode adjustment system to display the user selection mode OSD menu 480 that includes the display of the current first display resolution 483 (e.g., 4K resolution of 3840 pixels by 2160 pixels) highlighted or identified within a list of available alternative display resolutions 482.

The user in an embodiment at block 516 may select the current or an updated display resolution from a list of available display resolutions supported by digital display device firmware within the user selected resolution mode OSD menu, via the manual joystick directional device. For example, the user may select the current or an updated display resolution, such as any from a list of available display resolutions 482 supported by digital display device firmware within the second portion of the user selected resolution mode OSD menu 480, via the manual joystick directional device. In an embodiment, the user-selected display resolution 483 may be the current display resolution or a user-selected new or updated display resolution from among 482 at which the digital display is not currently operating and which may be highlighted upon selection with the manual joystick directional device.

At block 518, the DSP hardware controller of the digital display device in an embodiment may execute machine readable code instructions of the rapid manual monitor display mode adjustment system to display a list of available alternative display refresh rates that are compatible with the user-selected display resolution within the user selected resolution mode OSD menu onboard the digital display device. For example, upon selection by the user in an embodiment of one of the display resolutions given within the list 482 the DSP hardware controller of the digital display device may execute machine readable code instructions of the rapid manual monitor display mode adjustment system to display the list of available alternative display refresh rates 484 that are compatible with the user-selected display resolution from 482 on the digital display device within the user selected resolution mode OSD menu 480. In such a way, the user selected resolution mode in an embodiment may streamline this selection process by automatically jumping to the user selected resolution mode OSD menu 480, that lists the limited available display resolutions and compatible with the available display refresh rates for onboard the digital display device for user selection. This automatic narrowing of available options among resolutions and refresh rates to those compatible onboard the digital display device may significantly decrease the number of steps necessary for a user to change display resolution or display refresh rate in comparison to existing systems that require the user to navigate through several steps of a settings menu operated at a software application of the operably connected information handling system. Further, in contrast to the dual resolution mode described above with respect to FIG. 3, the user selected resolution mode OSD menu 480 may allow the user to select from a plurality of available display resolutions 482 and a plurality of display refresh rates 484, rather than automatically toggling between determined and restricted combinations of display resolution and display refresh rate.

The DSP hardware controller of the digital display device in an embodiment at block 520 may execute machine readable code instructions of the rapid manual monitor display mode adjustment system to determine whether the user has selected an updated display resolution or an updated display refresh rate that differs from the first display resolution or the first display refresh rate, respectively. If the user has selected an updated display resolution or an updated display refresh rate that differs from the first display resolution or the first display refresh rate, respectively, the method may proceed to block 522 for identification of a user selected display resolution or a dual display resolution selected via actuation input as the updated display resolution, or for identification of a user selected display refresh rate or dual display refresh rate selected via actuation input as the updated display refresh rate. If the user has not selected an updated display resolution or an updated display refresh rate that differ from the current first display resolution or the current first display refresh rate, respectively, the method may proceed back to block 502, where the GPU of the information handling system may continue to generate a video signal using the current display resolution and the current display refresh rate.

At block 522, in an embodiment in which the user has selected an updated display resolution or an updated display refresh rate that differs from the current first display resolution or the current first display refresh rate, respectively, the DSP hardware controller of the digital display device may execute machine readable code instructions of a rapid manual monitor display mode adjustment system to identify the user-selected display resolution or selected dual display resolution as an updated display resolution or a user-selected display refresh rate or selected dual display refresh rate as an updated display refresh rate.

The DSP hardware controller of the digital display device in an embodiment at block 524 may execute machine readable code instructions of the rapid manual monitor display mode adjustment system to generate a notification of a user-requested switch in settings of the GPU-generated video signal to the updated display resolution or the updated refresh rate using a single byte rapid display mode adjustment code determined from a resolution and refresh rate bit mapping table. For example, such a resolution and refresh rate bit mapping table may reserve the first four bits of the single byte rapid display mode adjustment code for identification of the updated refresh rate, and the second four bits of the single byte rapid display mode adjustment code for identification of the updated resolution. Further, the value given within the reserved bits may be associated within the resolution and refresh rate bit mapping table with specific display resolutions and display refresh rates. For example, a value of 0x0000 given within the second four bits of the single byte rapid display mode adjustment code may be associated within the resolution and refresh rate bit mapping table with a display resolution of 4K or 3840 pixels by 2160 pixels. As another example, a value of 0x0011 given within the first four bits of the single byte rapid display mode adjustment code may be associated within the resolution and refresh rate bit mapping table with a display refresh rate of 165 Hz. Such a resolution and refresh rate bit mapping table in embodiments herein may be stored at the display device memory of the digital display device, for access by the rapid manual monitor display mode adjustment system, and at a memory of the information handling system, for access by the monitor management software application. The single byte rapid display mode adjustment code is quickly generated and takes little or no bandwidth or transmission time from the display hardware controller at the digital display device to a monitor management software application executing on the operatively coupled information handling system 100. The method may then proceed to block 526 for notifying the operatively coupled information handling system of a need to switch the settings for a video signal being generated at the GPU of the information handling system to the updated display resolution and the updated display refresh rate upon transmission of the single byte rapid display mode adjustment code for those updated display resolution and updated refresh rate. This step is optional with respect to updated display resolution and refresh rates selected via the dual resolution mode in embodiments herein and the single byte rapid display mode adjustment code may be triggered automatically with selection, via actuation of the manual joystick directional device, between two preset combinations of resolution and refresh rate in the dual resolution mode.

At block 526, the DSP hardware controller of the digital display device may execute machine readable code instructions of the rapid manual monitor display mode adjustment system to notify a monitor management software application executing at the host information handling system of the updated resolution and updated refresh rate via the single byte rapid display mode adjustment code. The monitor management software application interfaces with controls for the GPU at the information handling system. Notification of the user-requested switch to update resolution and updated refresh rates to be used in the GPU-generated video signal settings from the current first display resolution and the current first display refresh may be triggered by receipt of the single byte rapid display mode adjustment code in some embodiments herein. In some embodiments where the updated display resolution and refresh rate is selected via the dual resolution mode, and block 524 is skipped, the DSP hardware controller of the digital display device may generate a new external device identifier (EDID) with identification of a toggled, updated display resolution and refresh rate to serve as such a notification of a switch in display resolution or refresh rate, for example.

A hardware processor of an information handling system operatively coupled to the digital display device in an embodiment at block 528 may execute machine readable code instructions of the monitor management software application to switch the GPU desktop mode and the GPU active signal mode from the first display resolution and the first display refresh rate to the updated display resolution and the updated display refresh rate. The execution of machine readable code instructions of the monitor management software application automatically generates and transmits an instruction, via an application programming interface (API) call to the information handling system GPU to switch the GPU desktop mode and the GPU active signal mode to the updated display resolution and the updated display refresh rate. This may involve the monitor management software application at the host information handling system identifying the updated display resolution or updated display refresh rate by referencing the stored resolution and refresh rate bit mapping table described above and automatically triggering the API call to the GPU to switch to the updated display resolution or updated display refresh rate in embodiments herein.

At block 530, the GPU of the operably coupled information handling system in an embodiment may change the video output GPU desktop mode and the video output GPU active signal mode to the updated display resolution and the updated display refresh rate, respectively. The GPU may further automatically notify the display device firmware of the switch to the updated display resolution and updated refresh rate, respectively. This may ensure that coordination of the video signal format and the display settings for the display panel of the digital display device.

The DSP hardware controller of the digital display device in an embodiment at block 532 may execute machine readable code instructions of the display device firmware to switch from the first display resolution and the first display refresh rate to the updated display resolution and the updated display refresh rate, respectively. In such a way, the updating of the display resolution or display refresh rate at both the GPU and the display device may be coordinated in embodiments herein using a simplified and quick solution that requires fewer transmitted communicated or instructions, potentially omits the request and response communication of an EDID, and significantly decreases the size and transmission time of such a communication using the single byte rapid display mode adjustment code. The method for a digital signal processor (DSP) of a digital display device executing code instructions of a rapid manual monitor display mode adjustment system to streamline the process by which the user adjusts the display resolution and display refresh rates may then end.

The blocks of the flow diagram of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A digital display device executing machine readable code instructions of a rapid manual monitor display mode adjustment system comprising:
a digital signal processing (DSP) hardware controller to execute machine readable code instructions of a digital display device firmware to display a GPU-generated video signal generated by a graphics processing unit (GPU) of an operably connected information handling system on a display panel at a first display resolution and a first display refresh rate that matches a video signal resolution and video signal refresh rate for the GPU-generated video signal;
the DSP hardware controller to execute machine readable code instructions of the rapid manual monitor display mode adjustment system to display a rapid manual display mode adjustment on screen display (OSD) control guide via the display panel and to receive a user actuation input at a manual joystick directional device to select a dual resolution mode toggle selection button within the rapid manual display mode adjustment OSD control guide for rapidly switching between two preset display resolutions for when a dual resolution mode is selected;
the DSP hardware controller to execute machine readable code instructions of the rapid manual monitor display mode adjustment system to receive the user actuation input at the manual joystick directional device for a user selected resolution mode toggle button to select a user selected resolution mode and prompt display of a user selected resolution mode OSD menu to list available display resolutions compatible at the digital display device;
the DSP hardware controller to receive selection of an updated display resolution via the dual resolution mode or the user selected resolution mode onboard the digital display device and to generate a notification code to instruct the GPU of the information handling system to generate the GPU-generated video signal at an updated video signal resolution matching the updated display resolution; and
the DSP hardware controller to receive and automatically perform a display mode adjustment instruction received from the information handling system to display the GPU-generated video signal at the updated display resolution.

2. The digital display device of claim 1, wherein the manual joystick directional device is accessible by a user on a housing for the digital display device.

3. The digital display device of claim 1, wherein a first of the two preset display resolutions is ultra-high definition and a second of the two preset display resolutions is 4K.

4. The digital display device of claim 1, wherein the user actuation input at the manual joystick directional device selecting an updated display resolution from the two preset display resolutions automatically includes selection of an updated display refresh rate from among two present display refresh rates that are compatible with the digital display device.

5. The digital display device of claim 4, wherein the notification code is transmitted to the information handling system to automatically adjust and generate the GPU-generated video signal with the video signal resolution and the video signal refresh rate that match the updated display resolution and the updated display refresh rate.

6. The digital display device of claim 1 further comprising:

the DSP hardware controller to execute machine readable code instructions of the rapid manual monitor display mode adjustment system to poll the digital display device firmware to determine that the display panel is currently displaying the GPU-generated video signal at a first of the two preset display resolutions prior to receiving the user actuation input at the manual joystick directional device to select a second of the two preset display resolutions to determine the toggling with the dual resolution mode toggle selection button in the dual resolution mode.

7. The digital display device of claim 1 further comprising:

the user actuation input at the manual joystick directional device to select the updated display resolution generates the notification code that is a single byte rapid display mode adjustment code indicating the updated display resolution; and the DSP hardware controller to transmit the single byte rapid display mode adjustment code to the information handling system to trigger a monitor management software application to automatically update the video signal resolution to match the updated display resolution at the GPU for GPU-generated video data and to cause the GPU to automatically transmit the display mode adjustment instruction to the DSP hardware controller for display the GPU-generated video signal at the updated display resolution without further intervention from the user.

8. A method of rapid monitor display mode adjustment onboard a digital display device comprising:

displaying a graphics processing unit (GPU)-generated video signal generated by a GPU of an operably connected information handling system on a display panel of the digital display device at a first display resolution and a first display refresh rate that matches a video signal resolution and video signal refresh rate for the GPU-generated video signal;

executing machine readable code instructions of the rapid manual monitor display mode adjustment system, via a digital signal processing (DSP) hardware controller, to display a rapid manual display mode adjustment on screen display (OSD) control guide on the display panel and to receive a user actuation input at a manual joystick directional device to select a dual resolution mode toggle selection button within the rapid manual display mode adjustment OSD control guide for rapidly switching between two preset combinations of display resolution and refresh rate for when a dual resolution mode is selected, wherein the rapid manual display mode adjustment OSD control guide further includes a user selected resolution mode toggle button available via user actuation to select a user selected resolution mode;

receiving the selection of an updated display resolution and refresh rate at the DSP hardware controller via actuation of the dual resolution mode toggle selection button in the dual resolution mode onboard the digital display device selecting the other of the two preset combinations of display resolution and refresh rate and to generate a notification code to instruct the GPU of the information handling system to generate the GPU-generated video signal at an updated video signal resolution and updated video signal refresh rate matching the updated display resolution and refresh rate; and to receiving and automatically executing, via the DSP hardware controller, a display mode adjustment instruction received from the information handling system to display the GPU-generated video signal at the updated display resolution and refresh rate.

9. The method of claim 8, wherein the manual joystick directional device is accessible by a user on a housing for the digital display device.

10. The method of claim 8, wherein the notification code is a single byte rapid display mode adjustment code and a first four bits identify the updated display resolution and a second four bits identify the updated display refresh rate.

11. The method of claim 8 further comprising:

executing machine readable code instructions of the rapid manual monitor display mode adjustment system, via the DSP hardware controller, to poll digital display device firmware to determine that the display panel is currently displaying the GPU-generated video signal at a first of the two preset combinations of display resolution and display refresh rate prior to receiving the user actuation input at the manual joystick directional device to select a second of the two preset combinations of display resolution and display refresh rate to determine the toggling with the dual resolution mode toggle selection button in the dual resolution mode.

12. The method of claim 8 further comprising:

to executing machine readable code instructions of the rapid manual monitor display mode adjustment system, via the DSP hardware controller, to receive the user actuation input at the manual joystick directional device for a user selected resolution mode toggle button to select a user selected resolution mode and prompt display of a user selected resolution mode OSD menu to list available display resolutions and available display refresh rates compatible at the digital display device when the dual resolution mode is not selected.

13. The method of claim 8 further comprising:

to transmitting notification code, via the DSP hardware controller, to the information handling system upon selection of the updated display resolution and the updated display refresh rate to trigger a monitor management software application to automatically update the video signal resolution to match the updated display resolution and update the video signal refresh rate to match the updated display refresh rate at the GPU for GPU-generated video data and to cause the GPU to automatically transmit the display mode adjustment instruction to the DSP hardware controller for display the GPU-generated video signal at the updated display resolution and refresh rate without further intervention from the user.

14. The method of claim 8 further comprising:

triggering a hardware processor of the information handling system executing machine readable code instructions of a monitor management software application, with transmission of the notification code, to generate an application programming interface (API) call to instruct the GPU of the information handling system to generate the GPU-generated video signal with the video signal resolution matching the updated display resolution and the video signal refresh rate matching the updated display refresh rate.

15. A digital display device executing machine readable code instructions of a rapid manual monitor display mode adjustment system comprising:

a digital signal processing (DSP) hardware controller to execute machine readable code instructions of a digital display device firmware to display a GPU-generated video signal generated by a graphics processing unit (GPU) of an operably connected information handling system on a display panel at a first display resolution and a first display refresh rate that matches a video signal resolution and video signal refresh rate for the GPU-generated video signal;

the DSP hardware controller to execute machine readable code instructions of the rapid manual monitor display mode adjustment system to display a rapid manual display mode adjustment on screen display (OSD) control guide via the display panel and to receive a user actuation input at a manual joystick directional device to select a dual resolution mode toggle selection button within the rapid manual display mode adjustment OSD control guide for rapidly switching between two preset combinations of display resolutions and display refresh rate for when a dual resolution mode is selected;

the DSP hardware controller to execute machine readable code instructions of the rapid manual monitor display mode adjustment system to receive the user actuation input at the manual joystick directional device for a user selected resolution mode toggle button to select a user selected resolution mode and prompt display of a user selected resolution mode OSD menu to list available display resolutions and available display refresh rates compatible at the digital display device;

the DSP hardware controller to receive selection of an updated display resolution and refresh rate via the dual resolution mode or the user selected resolution mode onboard the digital display device and to generate a notification code to instruct the GPU of the information handling system to generate the GPU-generated video signal at an updated video signal resolution and refresh rate matching the updated display resolution and refresh rate; and the DSP hardware controller to receive and automatically perform a display mode adjustment instruction received from the information handling system to display the GPU-generated video signal at the updated display resolution and refresh rate.

16. The digital display device of claim 15, wherein the manual joystick directional device is accessible by a user on a housing for the digital display device.

17. The digital display device of claim 15, wherein a first of the two preset display resolutions is ultra-high definition and a second of the two preset display resolutions is 4K.

18. The digital display device of claim 1, wherein the user actuation input at the manual joystick directional device selecting an updated display resolution from the list available display resolutions in the user selected resolution mode adjusts the user selected resolution mode OSD menu to list available display refresh rates limited by the selected updated display resolution compatible at the digital display device.

19. The digital display device of claim 15 further comprising:

the DSP hardware controller to execute machine readable code instructions of the rapid manual monitor display mode adjustment system to poll the digital display device firmware to determine that the display panel is currently displaying the GPU-generated video signal at a first of the two preset combinations of display resolution and display refresh rate prior to receiving the user actuation input at the manual joystick directional device to select a second of the two preset combinations of display resolution and display refresh rate to determine the toggling with the dual resolution mode toggle selection button in the dual resolution mode.

20. The digital display device of claim 15 further comprising:

the user actuation input at the manual joystick directional device to select the updated display resolution and refresh rate generates the notification code that is a single byte rapid display mode adjustment code including four bits indicating the updated display resolution and four bits indicating the updated display refresh rate; and the DSP hardware controller to transmit the single byte rapid display mode adjustment code to the information handling system to trigger a monitor management software application to automatically update the video signal resolution to match the updated display resolution and update the video signal refresh rate to match the updated display refresh rate at the GPU for GPU-generated video data and to cause the GPU to automatically transmit the display mode adjustment instruction to the DSP hardware controller for display the GPU-generated video signal at the updated display resolution and refresh rate without further intervention from the user.

\* \* \* \* \*